United States Patent
Gauffin et al.

(10) Patent No.: US 12,303,789 B2
(45) Date of Patent: May 20, 2025

(54) SYSTEMS AND METHODS FOR DETECTING AND PREVENTING FRAUDULENT ACTIVITIES IN DIGITAL ADVERTISING

(71) Applicant: Huuuge Global Ltd., Larnaca (CY)

(72) Inventors: Anton Gauffin, Berlin (DE); Wojciech Wronowski, Szczecin (PL)

(73) Assignee: Huuuge Global Ltd., Lamaca (CY)

( * ) Notice: Subject to any disclaimer, the term of this patent is extended or adjusted under 35 U.S.C. 154(b) by 483 days.

(21) Appl. No.: 17/945,541

(22) Filed: Sep. 15, 2022

(65) Prior Publication Data

US 2023/0017815 A1 Jan. 19, 2023

Related U.S. Application Data

(63) Continuation-in-part of application No. 17/019,551, filed on Sep. 14, 2020, now Pat. No. 11,465,055,
(Continued)

(51) Int. Cl.
*A63F 13/75* (2014.01)
*A63F 13/35* (2014.01)
(Continued)

(52) U.S. Cl.
CPC ............ *A63F 13/75* (2014.09); *A63F 13/35* (2014.09); *A63F 13/537* (2014.09); *A63F 13/79* (2014.09); *G07F 17/3241* (2013.01)

(58) Field of Classification Search
CPC ........ A63F 13/75; A63F 13/35; A63F 13/537; A63F 13/79; G06Q 30/0248; G07F 17/3241; G07F 17/3209; G07F 17/3255
(Continued)

(56) References Cited

U.S. PATENT DOCUMENTS

| | | | |
|---|---|---|---|
| 8,360,838 B2 * | 1/2013 | Nguyen | G07F 17/32 463/9 |
| 9,652,076 B1 * | 5/2017 | Newcomb | G06F 3/0485 |

(Continued)

OTHER PUBLICATIONS

European Patent Office, Extended European Search Report, Application No. 231770322, Mailed Aug. 7, 2023, 15 pages.

*Primary Examiner* — Michael A Cuff
(74) *Attorney, Agent, or Firm* — Ziegler IP Law Group, LLC.

(57) ABSTRACT

A system for detecting and preventing fraudulent activities in digital advertising, system including server arrangement that is communicably coupled with a user device. The server arrangement is configured to send a data element of given digital advertisement to the user device; receive user-interaction data from the user device responsive to rendering of the data element at the user device; receive sensor data from the user device, the sensor data being collected by at least one sensor of the user device during generation of user-interaction data; analyse at least one of: a number of taps indicated in user-interaction data, touch pressures during taps, sizes of touch areas on touchscreen during taps, locations of touch areas on touchscreen during taps, time stamps of taps, to detect whether the user of the user device is bot; and perform at least one action when analysis indicates that the user of the user device is bot.

21 Claims, 2 Drawing Sheets

Related U.S. Application Data which is a continuation-in-part of application No. 16/263,628, filed on Jan. 31, 2019, now abandoned, which is a continuation of application No. 15/953,793, filed on Apr. 16, 2018, now Pat. No. 10,207,189.

(51) Int. Cl.
*A63F 13/537* (2014.01)
*A63F 13/79* (2014.01)
*G07F 17/32* (2006.01)

(58) Field of Classification Search
USPC .......................................................... 463/29
See application file for complete search history.

(56) References Cited

U.S. PATENT DOCUMENTS

| | | | |
|---|---|---|---|
| 9,830,768 B2 | 11/2017 | Frenkel et al. | |
| 10,055,560 B2* | 8/2018 | Turgeman | G06F 21/316 |
| 10,319,182 B2* | 6/2019 | Wang | A63F 13/75 |
| 10,740,728 B1* | 8/2020 | Gabay | G06F 21/64 |
| 2008/0004107 A1 | 1/2008 | Nguyen et al. | |
| 2010/0222142 A1 | 9/2010 | Mori | |
| 2014/0143304 A1 | 5/2014 | Hegarty et al. | |
| 2014/0344927 A1 | 11/2014 | Turgeman et al. | |
| 2018/0108015 A1* | 4/2018 | Rogas | H04L 61/4552 |
| 2019/0102790 A1* | 4/2019 | Martino | G06Q 30/0248 |

* cited by examiner

SYSTEMS AND METHODS FOR DETECTING AND PREVENTING FRAUDULENT ACTIVITIES IN DIGITAL ADVERTISING

CROSS-REFERENCE TO RELATED APPLICATIONS

This application is a continuation-in-part of U.S. patent application Ser. No. 17/019,551, titled "SYSTEMS AND METHODS FOR DETECTING AND PREVENTING FRAUDULENT IN-APP ACTIVITIES" and filed on Sep. 14, 2020, which is incorporated herein by reference.

TECHNICAL FIELD

The present disclosure relates to systems for detecting and preventing fraudulent activities in digital advertising. The present disclosure also relates to methods for detecting and preventing fraudulent activities in digital advertising. The present disclosure further relates to computer program products for detecting and preventing fraudulent activities in digital advertising.

BACKGROUND

With increasing popularity and effectiveness of digital marketing, businesses have been increasingly allotting bigger budgets for digital advertisements as compared to other forms of advertising. Moreover, digital advertising is a convenient mode of promoting products and/or services. It assists businesses in making an in-depth analysis of response of their demographic and target audience to the digital advertisements. Furthermore, the digital advertisements can be altered easily to suitably fit it for a given demographic and targeted audience. Many times, major business decisions are made based on responses received from users who are presented such targeted digital advertisements. If data indicative of these responses is inaccurate or is manipulated, such business decisions may prove to be unprofitable or harmful for the businesses.

Nowadays fraudulent activities in digital advertising are on the rise. The data indicative of these responses is often manipulated by bots which interact with the digital advertisements instead of humans. Bots are automated programs designed to run specific tasks and interact with the digital advertisements in a specific manner. When bots interact with the digital advertisements instead of humans, an inaccurate indication of response is received by advertisers. Existing techniques to overcome the aforesaid problems incorporate security measures, for example, such as CAPTCHA, selection of a set of pictures containing an object from amongst a plurality of pictures, and the like, that are intended to distinguish users that are human from users that are bots. However, such existing security measures are inefficient, as they can be bypassed by well-programmed or well-trained bots.

Therefore, in light of the foregoing discussion, there exists a need to overcome the aforementioned drawbacks associated with detecting and preventing fraudulent activities in digital advertising.

SUMMARY

The present disclosure seeks to provide a system for detecting and preventing fraudulent activities in digital advertising. The present disclosure also seeks to provide a method for detecting and preventing fraudulent activities in digital advertising. The present disclosure further seeks to provide a computer program product for detecting and preventing fraudulent activities in digital advertising. An aim of the present disclosure is to provide a solution that overcomes at least partially the problems encountered in prior art.

In one aspect, an embodiment of the present disclosure provides a system for detecting and preventing fraudulent activities in digital advertising, the system comprising a server arrangement that is communicably coupled with a user device, wherein the server arrangement is configured to:
  send a data element of a given digital advertisement to the user device;
  receive user-interaction data from the user device responsive to a rendering of the data element at the user device, wherein the user-interaction data is indicative of one or more taps being generated in response to the data element being rendered at the user device, wherein the user-interaction data is time stamped;
  receive sensor data from the user device, the sensor data being collected by at least one sensor of the user device during generation of the user-interaction data, wherein the at least one sensor comprises a touch-pressure sensor, and the sensor data is indicative of at least one of: a touch pressure applied by the user on a touchscreen of the user device during each tap, a size of a touch area on the touchscreen during each tap, a location of the touch area on the touchscreen during each tap, wherein the sensor data is time stamped;
  analyse at least one of: a number of taps indicated in the user-interaction data, touch pressures during the taps, sizes of touch areas on the touchscreen during the taps, locations of the touch areas on the touchscreen during the taps, time stamps of the taps, to detect whether a user of the user device is a bot; and
  perform at least one action when the analysis indicates that the user of the user device is a bot.

In another aspect, an embodiment of the present disclosure provides a method for detecting and preventing fraudulent activities in digital advertising, the method comprising:
  sending a data element of a given digital advertisement to a user device;
  receiving user-interaction data from the user device responsive to a rendering of the data element at the user device, wherein the user-interaction data is indicative of one or more taps being generated in response to the data element being rendered at the user device, wherein the user-interaction data is time stamped;
  receiving sensor data from the user device, the sensor data being collected by at least one sensor of the user device during generation of the user-interaction data, wherein the at least one sensor comprises a touch-pressure sensor, and the sensor data is indicative of at least one of: a touch pressure applied by the user on a touchscreen of the user device during each tap, a size of a touch area on the touchscreen during each tap, a location of the touch area on the touchscreen during each tap, wherein the sensor data is time stamped;
  analysing at least one of: a number of taps indicated in the user-interaction data, touch pressures during the taps, sizes of touch areas on the touchscreen during the taps, locations of the touch areas on the touchscreen during the taps, time stamps of the taps, to detect whether a user of the user device is a bot; and
  performing at least one action when the analysis indicates that the user of the user device is a bot.

In yet another aspect, an embodiment of the present disclosure provides a computer program product for detecting and preventing fraudulent activities in digital advertising, the computer program product comprising a non-transitory machine-readable data storage medium having stored thereon program instructions that, when executed by a processing device, cause the processing device to:

send a data element of a given digital advertisement to a user device;

receive user-interaction data from the user device responsive to a rendering of the data element at the user device, wherein the user-interaction data is indicative of one or more taps being generated in response to the data element being rendered at the user device, wherein the user-interaction data is time stamped;

receive sensor data from the user device, the sensor data being collected by at least one sensor of the user device during generation of the user-interaction data, wherein the at least one sensor comprises a touch-pressure sensor, and the sensor data is indicative of at least one of: a touch pressure applied by the user on a touchscreen of the user device during each tap, a size of a touch area on the touchscreen during each tap, a location of a touch area on the touchscreen during each tap, wherein the sensor data is time stamped;

analyse at least one of: a number of taps indicated in the user-interaction data, touch pressures during the taps, sizes of touch areas on the touchscreen during the taps, locations of the touch areas on the touchscreen during the taps, time stamps of the taps, to detect whether a user of the user device is a bot; and     perform at least one action when the analysis indicates that the user of the user device is a bot.

Embodiments of the present disclosure substantially eliminate or at least partially address the aforementioned problems in the prior art, and enable accurate detection and prevention of fraudulent activities by accurately detecting whether the user is the bot and performing the at least one action when the user is the bot.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system for detecting and preventing fraudulent activities in digital advertising, the system comprising a server arrangement that is communicably coupled with a user device, wherein the server arrangement is configured to:

send a data element of a given digital advertisement to the user device;

receive user-interaction data from the user device responsive to a rendering of the data element at the user device, wherein the user-interaction data is indicative of one or more taps being generated in response to the data element being rendered at the user device, wherein the user-interaction data is time stamped;

receive sensor data from the user device, the sensor data being collected by at least one sensor of the user device during generation of the user-interaction data, wherein the at least one sensor comprises a touch-pressure sensor, and the sensor data is indicative of at least one of: a touch pressure applied by the user on a touchscreen of the user device during each tap, a size of a touch area on the touchscreen during each tap, a location of the touch area on the touchscreen during each tap, wherein the sensor data is time stamped;

analyse at least one of: a number of taps indicated in the user-interaction data, touch pressures during the taps, sizes of touch areas on the touchscreen during the taps, locations of the touch areas on the touchscreen during the taps, time stamps of the taps, to detect whether a user of the user device is a bot; and     perform at least one action when the analysis indicates that the user of the user device is a bot.

In another aspect, an embodiment of the present disclosure provides a method for detecting and preventing fraudulent activities in digital advertising, the method comprising:

sending a data element of a given digital advertisement to a user device;

receiving user-interaction data from the user device responsive to a rendering of the data element at the user device, wherein the user-interaction data is indicative of one or more taps being generated in response to the data element being rendered at the user device, wherein the user-interaction data is time stamped;

receiving sensor data from the user device, the sensor data being collected by at least one sensor of the user device during generation of the user-interaction data, wherein the at least one sensor comprises a touch-pressure sensor, and the sensor data is indicative of at least one of: a touch pressure applied by the user on a touchscreen of the user device during each tap, a size of a touch area on the touchscreen during each tap, a location of the touch area on the touchscreen during each tap, wherein the sensor data is time stamped;

analysing at least one of: a number of taps indicated in the user-interaction data, touch pressures during the taps, sizes of touch areas on the touchscreen during the taps, locations of the touch areas on the touchscreen during the taps, time stamps of the taps, to detect whether a user of the user device is a bot; and performing at least one action when the analysis indicates that the user of the user device is a bot.

In yet another aspect, an embodiment of the present disclosure provides a computer program product for detecting and preventing fraudulent activities in digital advertising, the computer program product comprising a non-transitory machine-readable data storage medium having stored thereon program instructions that, when executed by a processing device, cause the processing device to:

send a data element of a given digital advertisement to a user device;

receive user-interaction data from the user device responsive to a rendering of the data element at the user device, wherein the user-interaction data is indicative of one or more taps being generated in response to the data element being rendered at the user device, wherein the user-interaction data is time stamped;

receive sensor data from the user device, the sensor data being collected by at least one sensor of the user device during generation of the user-interaction data, wherein the at least one sensor comprises a touch-pressure sensor, and the sensor data is indicative of at least one of: a touch pressure applied by the user on a touchscreen of the user device during each tap, a size of a touch area on the touchscreen during each tap, a location of a touch area on the touchscreen during each tap, wherein the sensor data is time stamped;

analyse at least one of: a number of taps indicated in the user-interaction data, touch pressures during the taps, sizes of touch areas on the touchscreen during the taps, locations of the touch areas on the touchscreen during the taps, time stamps of the taps, to detect whether a user of the user device is a bot; and perform at least one action when the analysis indicates that the user of the user device is a bot.

The present disclosure provides the aforementioned system, method and computer program product for detecting and preventing fraudulent activities in digital advertising. These aspects allow for a type of the user to be accurately determined based on the user's interaction with the given digital advertisement. The type of the user can be detected to be the bot or the human. The user-interaction data and the sensor data are utilised to accurately analyse whether the user of the user device is the bot. Thus, the aforesaid aspects advantageously provide a user-friendly and efficient way of detecting and preventing fraudulent activities. Such fraudulent activities generally involve the use of bots for mimicking human actions to generate inaccurate interest in an advertised product and/or service. Since the aforementioned aspects advantageously accurately determine when the given digital advertisement is being interacted with by the bot rather than the human, the fraudulent activities in digital advertising are detected accurately, and are prevented by performance of the at least one action by the server arrangement.

Throughout the present disclosure, the term "server arrangement" refers to hardware, software, firmware, or a combination of these that provides data processing functionality by way of providing resources, data, services, or programs to the system. Optionally, the server arrangement is implemented as at least one of: a cloud server arrangement, a local server arrangement, or a combination thereof. The server arrangement comprises at least one server. In some implementations, the server arrangement includes a single server, whereas in other implementations, the server arrangement includes a plurality of servers. Optionally, the server arrangement is configured to store, at a database associated therewith, data related to digital advertising. For example, the server arrangement may store information about a number of users that receive a given digital advertisement, the given digital advertisement and its metadata, and the like, in the database associated therewith. Optionally, the database is implemented at a data repository communicably coupled to the server arrangement.

The term "user device" refers to an interactive device, via which the user is capable of accessing and interacting with the given digital advertisement. Examples of the user device include, but are not limited to, a computer, a smartphone, a laptop, a tablet, a smartwatch, and a phablet. The user device includes the touchscreen for displaying data related to the given digital advertisement to the user and for receiving touch inputs related to the interaction of the user with the given digital advertisement. The user device also includes the at least one sensor for collecting the sensor data.

The server arrangement is communicably coupled with the user device through a communication network. The communication network may be a wired network, a wireless network, or any combination thereof. Examples of the communication network include, but are not limited to, Local Area Networks (LANs), Wide Area Networks (WANs), Internet, radio networks and telecommunication networks. In digital advertising, multiple user devices associated with multiple users are connected to the at least one server of the server arrangement through the communication network.

The term "digital advertising" refers to marketing and/or promoting products and services to a target audience, on digital platforms. In digital advertising, digital advertisements for promotion of the products and services are created and then shared with the target audience. Examples of various forms of the given digital advertisement include, an image, a text, a video, a survey form, a pop-up, and the like. The given digital advertisement is a package of data elements, which when rendered on the user device, advertise a given product and/or service of a given organization. In a first example, the given digital advertisement may be a survey form comprising questions pertaining to user experiences with respect to the given product and/or service of the given organization. In a second example, the given digital advertisement may be an image depicting a newly launched product by the given organization.

The term "data element" refers to data component that pertains to the given digital advertisement. The data element conveys information pertaining to the product and/or the service that is the subject of the given digital advertisement. Examples of the data element include one or more of a portion or an entirety of an image, a portion or an entirety of text, at least one frame of a video, at least one field in a survey form, at least one clickable button on a pop-up, and the like. In the first example, the data element may be a field in the survey form. For example, the field may require inputting a user rating for the given product and/or service. It will be appreciated that the data element being sent to the user device elicits a response from a user of the user device, which is captured as the user-interaction data.

Throughout the present disclosure, the term "user-interaction data" refers to data associated with an interaction of the user with the data element rendered at the user device. Upon receiving the data element, the user device renders the data element on the touchscreen therein. The user interacts with the rendered data element by providing a touch input (in form of the one or more taps) using the touchscreen. The touch input may be provided by the user using one or more fingers and/or a stylus. Such interaction of the user with the software application is transmitted as the user-interaction data to the server arrangement.

It will be appreciated that the user-interaction data is indicative of the one or more taps. Optionally, the user-interaction data is indicative of at least one of: the number of taps, the touch pressures during the taps, the sizes of touch areas on the touchscreen during the taps, the locations of the touch areas. Referring to the first example, the one or more taps would be generated by the user while responding to the field of the survey. For example, the field of the survey form may require inputting of a user rating of the given product and/or service, thus the user may have to either tap to enter a rating or a digit signifying the rating, or tap to choose one option from amongst multiple options to provide the rating, or tap to slide a slider to input the rating, or similar. Herein, each of the above-mentioned exemplary ways of interacting would require the user to tap the user device, and the one or more taps capture the user's interaction with the data element.

Moreover, each of the one or more taps are time stamped. Such additional information pertaining to the user-interaction data assists in verifying user interactions and ensuring authenticity of the same. The time stamp captures an accurate time and date of the one or more taps indicated in the user-interaction data. It will be appreciated that the time stamp may be captured in any format of date and time. Referring to the first example, the time stamp of a tap choosing the user rating may be 11:07:22.66 02/09/2022. This means that the time stamp indicates that the user tapped to provide the user rating at 11:07:22.66 on 2 Sep. 2022. Herein, time is captured in a military (24 hour) format, and date is captured in a DD/MM/YYYY format. It will be appreciated that time is captured in fractions of seconds (for example, in milliseconds, microseconds, or similar) so that multiple taps within a same second may also be distinctly identified. The time stamps additionally enable the server arrangement to correlate rendering of the at least one data element with the user-interaction data, as well as with the sensor data. For this purpose, a clock of a processor of the user device is employed to assign time stamps to at least a time instant at which the one or more taps are generated, and optionally also to at least one of: a time instant at which the data element is rendered at the user device, a time instant at which the at least one sensor collects data (i.e., sensor data).

Optionally, the user-interaction data is further indicative of at least one of:
a time elapsed between a time instant at which the data element is rendered at the user device and a time instant at which the one or more taps are generated,
a total time duration in which the one or more taps are generated,
a time duration in which a given tap is generated,
a time elapsed between consecutive taps.

In this regard, the user-interaction data is indicative of a manner of interaction of the user with the user device when the data element of the given digital advertisement is rendered on the user device. It will be appreciated that the manner of interaction differs from user to user and thus, can be used to distinguish one user from another. Such a manner of interaction is also indicative of a speed of response of the user, a pattern of response of the user, a frequency of response of the user, and the like. For example, some users have a better reflex and may tap the user device faster as compared to other users who may pause a bit and hence tap the user device later. Such variation in the manner of interacting can be identified accurately using the user-interaction data that is further indicative of at least one of the aforementioned attributes. Moreover, such attributes may be used to identify how users which are human interact with the data element at the user device, and in turn assist the server arrangement in accurately differentiating humans from bots. Herein, the aforementioned attributes represent a response time and a response manner of the user.

Furthermore, in this regard, the time elapsed between the time instant at which the data element is rendered at the user device and the time instant at which the one or more taps are generated refers to a duration of time taken by the user for responding to rendering of the data element. It will be appreciated that this time duration would be from the time instant at which the data element is rendered and to a time instant at which a given tap from amongst the one or more taps is generated. In a third example, if the data element is rendered at the user device at 16:44:52, a first tap is generated at 16:44:57, a second tap is generated at 16:45:00, and a third tap is generated at 16:45:05, then the time elapsed between the time instant at which the data element is rendered at the user device and the time instant at which the one or more taps are generated may be 13 seconds. The total time duration in which the one or more taps are generated refers to a duration of time from a time instant at which a first tap is generated to a time instant at which a last tap is generated. In a fourth example, if the data element is rendered at the user device at a time 't', a first tap is generated in 2 seconds, a second tap is generated in 3 seconds and a third tap is generated in 5 seconds, then the total time duration in which the one or more taps are generated may be 10 seconds. The time duration in which a given tap is generated refers to the time taken by the user to generate the given tap. Referring to the fourth example, the first tap may be generated in 2 seconds, the second tap may be generated in 3 seconds and the third tap may be generated in 5 seconds. The time elapsed between consecutive taps refers to a time duration between two consecutive taps. Herein, the time elapsed between consecutive taps is the time duration between time instants of an $x^{th}$ tap and an $x+1^{st}$ tap. Referring to the third example, the time elapsed between the first and the second tap may be 3 seconds, and the time elapsed between the second and the third tap may be 5 seconds.

The term "sensor data" refers to data collected by the at least one sensor of the user device. The sensor data may be collected before, during or after the interaction of the user with the data element. It will be appreciated that the sensor data is indicative of a sensing of user interaction. For example, the sensor data may indicate that the user tapped on the touchscreen of the user device. Moreover, the sensor data is time stamped. It will be appreciated that the sensor data being time stamped assists in analysing whether the user is the bot by corresponding time stamps of the sensor data with time stamps of the user-interaction data. Referring to the first example, the time stamp of the sensor data indicating the tap by the user choosing the user rating may be 11:07:22.66 02/09/2022.

Optionally, the at least one sensor is implemented as at least one of: a touch pressure sensor, a touch location sensor. Optionally, when the at least one sensor comprises the touch-pressure sensor, the sensor data is indicative of the touch pressure applied by the user on the touchscreen of the user device during each tap. The touch pressure sensor refers to a sensor which senses the touch pressure applied by the user on the touchscreen during the one or more taps. The touch pressure is an amount of pressure applied by the user on the touchscreen when the user touches the touchscreen to generate the one or more taps. It will be appreciated that the touch pressure may be high when the user forcefully presses the touchscreen and low when the user gently (i.e., delicately) touches the touchscreen.

Optionally, when the at least one sensor comprises the touch location sensor, the sensor data is indicative of at least one of: the size of a touch area on the touchscreen during each tap, a location of the touch area on the touchscreen during each tap. The size of the touch area during a tap refers to a size of an area that is touched on the touchscreen during said tap. The size of the touch area could depend on how the user oriented his/her finger(s) and/or the stylus with respect to the touchscreen during the tap, size of a touch gesture made during the tap, and similar. The size of the touch area during a tap can be expressed in terms of a number of pixels of the touchscreen that are pressed (i.e., activated) during the tap, a percentage of a total number of pixels of the touchscreen, and similar. In an example, the size of the touch area during a tap involving a click gesture may be 20 pixels, whereas the size of the touch area during a tap involving a swipe gesture may be 140 pixels. In another example, the size of the touch area may be 40 pixels when the user harshly presses the touchscreen with an entirety of the user's fingertip touching the touchscreen, and 5 pixels when the user delicately touches the touchscreen with a stylus. The location of the touch areas on the touchscreen during each tap indicates which portion of the data element the user interacts with during the taps. The location of the touch areas on the touchscreen may be expressed in terms of pixel coordinates and/or with respect to distance from an origin. In an example, on a user device having 1080×1920 pixels, a first portion of the data element may be at location 360,1600 and a second portion of the data element may be at location 720,1600. Herein, if the location of a touch area on the touchscreen is 360,1600; then it may be deduced that the user is interacting with the first portion of the data element.

Optionally, the at least one sensor further comprises at least one of: an accelerometer, a gyroscope, and wherein the sensor data is further indicative of at least one of: a movement of the user device during the user interaction, an orientation of the user device during the user interaction. The term "accelerometer" refers to an element which measures acceleration of the user device. The accelerometer measures acceleration of the user device along at least one axis in a coordinate system during the user interaction, wherein such acceleration is indicative of the movement of the user device during the user interaction. Optionally, said coordinate system is a local coordinate system of the user device. The term "gyroscope" refers to an element which measures orientation of the user device. Optionally, the gyroscope comprises a spinning wheel or disc, whose axis of rotation rotatably assumes an orientation corresponding to the orientation of the user device. The orientation of the user device may be determined by measuring an angular deviation from a reference orientation, the angular deviation being measured along at least one axis in a coordinate system. It will be appreciated that when the user is a human, the human may interact with the user device to perform some actions involving the movement and/or the orientation of the user device, for responding to the data element. The sensor data indicative of such movement and/or orientation may be transmitted to and analysed by the server arrangement to confirm physical actions associated with the interaction of the user with the user device. Such physical actions are performed by humans only and not by bots, so such sensor data enables in accurately determining whether the user of the user device is the bot. In general, for the purposes of the present disclosure, the at least one sensor is implemented to determine whether the user is the human or the bot.

Optionally, the at least one sensor further comprises at least one of: a location sensor, an imaging sensor, a temperature sensor, a proximity sensor, a fingerprint sensor, and wherein the sensor data is further indicative of at least one of: a location of the user device, an image of the user, an image of surroundings of the user device, an ambient temperature in surroundings of the user device, a proximity of the user to the user device, a fingerprint of the user. The location sensor is a sensor which detects the location of the user device. Optionally, the location sensor is implemented as one of: a Global Positioning System (GPS) receiver, a Global navigation satellite system (GNSS) receiver. In an example, the location sensor may be the GPS receiver for detecting location coordinates of the user device. Further, if the user is interacting with the data element while travelling from one point to another, the location sensor may continuously detect the location of the user device to determine a movement trajectory of the user. Such sensor data (i.e., the location) sensed by the location sensor is transmitted to and analysed by the server arrangement, for example, by comparing with a pre-known location of the user device from an IP address thereof, to confirm if the user is actually accessing the user device or if the user-interaction data is being generated by some remote computer implementing bot(s). The imaging sensor is a sensor which captures light signals to generate images. It will be appreciated that the imaging sensor is capable of capturing the image of the user and/or the image of the surroundings of the user device. Such images, when captured during the interaction of the user with the data element (namely, when the user-interaction data is being generated), enable the server arrangement to detect the presence and physical appearance of the user of the user device. The temperature sensor is a sensor which measures the ambient temperature in the surroundings of the user device. The ambient temperature may be affected by the presence/absence of the user in the surroundings of the user device, and thus it serves as an indicator of whether the user using the user device is a human. The proximity sensor is a sensor which measures the proximity of the user to the user device. The proximity sensor may be employed during the user's interaction with the data element to confirm if the user is using the user device is human since the human is typically required to be in proximity of the user device for using the user device. The fingerprint sensor is a sensor which senses the fingerprint of the user. The fingerprint of the user enables in determining whether the user using the user device is human and optionally, in verifying an identity of the user. Beneficially, when the at least one sensor further comprising at least one of the above-mentioned sensors, the sensor data so obtained enables the server arrangement to accurately detect whether the user is a human or the bot.

The server arrangement performs an analysis to detect whether the user of the user device is the bot, as described in detail below. The number of taps indicated in the user-interaction data is a numerical value indicating how many times the user tapped the touchscreen to respond to the given digital advertisement. It will be appreciated that a data element can trigger only a specific number of taps, depending on a type and a content of the data element. For example, if the digital advertisement is a survey having eight fields, each having two options for the user to choose one option from, there would be eight taps made by the user to interact with the given digital advertisement.

The touch pressures during the taps are amounts of pressure applied by the user during the taps. It will be appreciated that the touch pressures may vary during consecutive taps for the users that are humans, since humans do not typically calculate and put an exactly a same amount of pressure each time. For example, if the user is interacting with a data element that requires four taps, the user may apply pressures P1, P2, P3 and P4 to a first tap, a second tap, a third tap and a fourth tap, respectively, wherein P1>P3>P2>P4.

The sizes of the touch areas on the touchscreen during the taps refers to an extent of the touch areas that are touched by the user during the taps. The touch areas on the touchscreen during the taps can be expressed in terms of a number of pixels of the touchscreen that are pressed (i.e., activated) during the taps, a percentage of a total number of pixels of the touchscreen that are pressed during the taps, and similar. It will be appreciated that the sizes of touch areas may vary during the taps when the user is a human, since humans do not typically calculate and touch only an exactly a same-sized area during the taps. Optionally, the size of a given touch area is directly related to a touch pressure during a tap on the given touch area. In an example, if the size of the touch area during a first tap involving a click gesture is 20 pixels and the size of the touch area during a second tap involving a swipe gesture is 140 pixels, then the size of the touch areas on the touchscreen during the taps may be 160 pixels.

Optionally, the locations of the touch areas on the touchscreen are expressed as locations of a centre point of the touch areas. The locations of the touch areas optionally depend on a layout of content of the data element. For example, the touch areas may be located on a right side of the given digital advertisement. The locations of the touch areas during the taps may vary when the user is a human since humans cannot calculate and tap on an exact specific location during the taps. Optionally, when the locations of the touch areas during the taps are exactly same, it is detected upon analysing that the user of the user device is the bot.

The time stamps of the taps are analysed by comparing said time stamps with the time stamps of the sensor data. Herein, when a time stamp of a given tap matches with a corresponding time stamp in the sensor data, then it is detected upon analysing that the user is human. Otherwise, when the time stamp of the given tap does not match with the corresponding time stamp in the sensor data, then it is detected upon analysing that the user is the bot. For example, if the time stamp of a given tap is 14:21:34 and the time stamp of the sensor data is 14:21:34, it may be detected that the user is human. However, if the time stamp of the sensor data is 14:22:34, or if such corresponding sensor data indicating the given tap is not available, then it may be detected that the user is the bot. It will be appreciated that time stamps may be analysed to determine a rate at which the taps were made, and determine which taps correspond to which portion of the data element. Moreover, once a particular data element is rendered, any taps within a predefined time period from the time of rendering of the particular data element are considered to be associated with that particular data element.

Optionally, the server arrangement employs at least one data processing technique for analysing at least one of: the number of taps indicated in the user-interaction data, the touch pressures during the taps, the sizes of touch areas on the touchscreen during the taps, the locations of the touch areas on the touchscreen during the taps, the time stamps of the taps. Examples of the at least one data processing technique include, but are not limited to, data matching, pattern recognition, coordinate geometry techniques, and image processing.

Throughout the present disclosure, the term "bot" refers to a computer program that operates to simulate human activity. The bot typically performs automated, repetitive tasks. Optionally, the bot operates based on pre-defined instructions. Additionally or alternatively, optionally, the bot operates based on artificial intelligence. To detect whether or not the user is the bot, the server arrangement analyses at least one of the above-mentioned parameters. It will be appreciated that the user of the user device is not detected to be the bot, when the analysis indicates presence of human involvement and/or consistency between the timestamps of the user-interaction data and the timestamps of the sensor data. It will be appreciated that such accurate identification of the bot by the above-mentioned analysis beneficially reduces and/or prevents fraudulent activities in digital advertising since bots are generally used for such fraudulent activities.

Optionally, when analysing the at least one of: the number of taps, the touch pressures, the sizes of the touch areas, the locations of the touch areas, the time stamps of the taps, to detect whether the user is a bot, the server arrangement is configured to:

calculate a reliability factor for the user based on said analysis; and detect whether or not the user is a bot, based on the calculated reliability factor.

Throughout the present disclosure, the "reliability factor" of the user refers to a score which indicates a reliability of the user. The reliability factor of the user indicates a reliability of the user with respect to the fraudulent activities (i.e., how reliable is the user in terms of not engaging in the fraudulent activities). Optionally, greater the reliability factor of the user, higher is a likelihood that the user is a human, and vice versa. This is so because humans (as users) are more reliable than bots, since they are less likely to be engaged in fraudulent activities in digital advertising. In an embodiment, the reliability factor is a measure of indication of non-fraudulent activity in the analysis. In this regard, higher measure of non-fraudulent activity in the analysis, higher is the reliability factor. In another embodiment, the reliability factor for the user is a probability of the user being a human, based on said analysis. In this regard, the probability of the user being the human may be calculated based on user-interaction trends observed in the analysis. Optionally, the reliability factor is expressed as a floating number or an integer. Optionally, the reliability factor lies in a range of: 0-100, 0-10, or 0-1. For example, the reliability factor may be from 0, 1, 2, 4, 8, 12, 18, 25, 35, 50, 65, 75, 82, 88, 92 or 94 up to 2, 4, 8, 12, 18, 25, 35, 50, 65, 75, 82, 88, 92, 96, 98 or 100. In an example, the reliability factor may be 90. Herein, since the reliability factor is high, it may be deduced that the user is human.

In an exemplary implementation, a combination of the number of taps, the touch pressures, the sizes of the touch areas, the locations of the touch areas, and/or the time stamps of the taps are analysed to detect the inherent patterns of the user. It may be understood, if a similar pattern is detected for a longer duration of time, the server arrangement may determine that the type of the user is the bot, since the bot is designed to do a specific task and follows a specific pattern, and may thus provide a lower reliability factor in such case. This can be done since a same user which is human may have different interactions for same elements/conditions over a period of time in execution of the digital advertisement, whereas the bot is designed to do a specific task and follows a specific pattern. In an example where the reliability factor for the user is a probability of the user being a human, if an image from the imaging sensor demonstrates the user of the user device being human, the reliability factor may be 95. In another example where the reliability factor is a measure of indication of non-fraudulent activity in the analysis, if the location of the user device is India but a location from which user-interaction is detected is Poland, the reliability factor may be 30 and it may be deduced that the user device is remotely controlled for a fraudulent activity. Optionally, when detecting whether or not the user is the bot, the server arrangement compares the reliability factor for the user with a reference reliability value. The reference reliability value may be chosen such that when the reliability factor is greater than or equal to the reference reliability value, the user is determined to be human, whereas when the reliability factor is less than the reference reliability value, the user is determined to be the bot. Optionally, the reference reliability value lies in a range of 40-60. For example, the reliability factor may be from 40, 42, 45, 48, 52, 55 or 58 up to 42, 45, 48, 52, 55, 58 or 60. In an example, the reference reliability value may be 50. In another example, if the reliability factor is 60 and the reference reliability value is 50, it may be deduced that the user is human. In yet another example, if the reliability factor is 20 and the reference reliability value is 50, it may be deduced that the user is the bot.

Alternatively, optionally, the server arrangement is configured to:
  receive respective user-interaction data and respective sensor data at respective points of time from a plurality of user devices to which data elements of digital advertisements are sent;
  analyse the respective user-interaction data and the respective sensor data received from the plurality of user devices, based on their time stamps, to determine a pattern of user interaction with the digital advertisements; and
  train a machine learning model based on the determined pattern of user interaction with the digital advertisements, wherein the trained machine learning model is to be employed to analyse the at least one of: the number of taps, the touch pressures, the sizes of the touch areas, the locations of the touch areas, the time stamps of the taps to detect whether the user is a bot.

In this regard, the respective user-interaction data and the respective sensor data are historical data collected from the plurality of user-devices prior to deployment of the system. For example, the respective user-interaction data and the respective sensor data may be collected by providing the data elements to a group of users that are human. It will be appreciated that the respective user-interaction data and the respective sensor data is collected based on responses by the users that are human, such that patterns of user interaction of such users can be determined by analysis. For example, the patterns of user interaction may indicate that touch pressures vary across the taps. Optionally, the server arrangement employs at least one data processing technique for analysing the respective user-interaction data and the respective sensor data received from the plurality of user devices. Examples of the at least one data processing technique include, but are not limited to, data matching, pattern recognition, coordinate geometry techniques, and image processing. The pattern of user interaction is utilised for training the machine learning model. The pattern of user interaction refers to a pattern followed by humans while interacting with the data elements.

For example, the taps by a user which is human would show a pattern of variation in pressure, response time, and the like, for consecutive taps. Therefore, in order to train the machine learning model of the server arrangement, the pattern of user interaction with the digital advertisements by real humans is fed thereto. For example, when the trained machine learning model analyses the touch pressures are constant across the taps, the trained machine learning model may detect that the user is the bot.

The pattern of user interaction may include at least one of: a range of possible values, an average value, of at least one of the aforementioned attributes of interactions of the users with their corresponding user devices. For example, the pattern of user interaction may include a range of an average number of taps, a range of an average touch pressure for taps, a range of an average size of the touch areas, a range of an average location of the touch areas, a range of an average time stamp of the taps, a range of an average of response times of the users, a range of an average of time durations in which responses are provided, and the like.

Optionally, the machine learning model is trained using at least one machine learning algorithm. The machine learning model is trained based on the respective user-interaction data and the respective sensor data, thereby allowing the machine learning model to learn from such historical data and make its own assessments based on such learning. Optionally, once the system is deployed, usage data of the system is utilized to further train the machine learning model. This enables the machine learning model to improve its accuracy over time.

As mentioned earlier, when the analysis indicates that the user of the user device is the bot, the at least one action is performed in order to prevent fraudulent activities in digital advertising. Herein, the at least one action refers to corrective measure that is implemented when the bot is discovered, for preventing fraudulent activities by the bot. Detection of the user being the bot is an indicator of ongoing fraudulent activities. Thus, the detection of the user being the bot is also the detection of the fraudulent activities.

Optionally, the at least one action comprises at least one of: notifying an advertising agency of the given digital advertisement, stopping to send any further data element to the user device, blacklisting a user account of the user, blacklisting the user device, recording a fraudulent activity conducted by the bot, recording information pertaining to the bot. The action of "notifying the advertising agency of the given digital advertisement" involves raising a flag to indicate the occurrence of the fraudulent activity to the advertising agency. The advertising agency may then decide on next steps to be undertaken with respect to the fraudulent activity. As an example, temporary disablement of the given digital advertisement may be performed to pause a particular session of sharing the given digital advertisement.

Furthermore, the action of "stopping to send any further data element to the user device" involves disabling further sharing of the given digital advertisement with the user device. In this way, the given digital advertisement is not shown in future on the user device. In such a case, no data element is transmitted to or received from the user device.

Moreover, the action of "blacklisting the user account of the user" involves indicating the user account to belong to the bot. In such a case, user-interaction data of the user may be discarded or disregarded. Furthermore, the blacklisted user account may not be permitted to engage in any future activity pertaining to digital advertising. In one scenario, when multiple user accounts are present in a single user device, only the user account that is determined to be used by the bot may be blacklisted. Alternatively, in another scenario, all communication with the user device may be blocked, and all user accounts present in the user device may be prevented from further interaction with the given digital advertisement, or future digital advertisements. This may be achieved by blacklisting a Media Access Control (MAC) address of the user device or another unique identifier of the user device.

Furthermore, the action of "recording a fraudulent activity conducted by the bot" involves generating a record about the fraudulent activity performed by the bot on the user device with respect to the given digital advertisement. The record that is generated may be in the form of one or more of text, an image, a table, a list, or similar. For example, the record may indicate that the bot taps to indicate interest in a product that is advertised, after 1-minute intervals. Moreover, the action of "recording information pertaining to the bot" involves generation of a record about a code employed by the bot or a version of the bot being implemented. Such a record may be stored in the database and may be further analysed to prevent occurrences of such fraudulent activities in future and also to help in accurately detecting bots in future.

Optionally, the server arrangement is configured to allow the user to continue accessing and interacting with the given digital advertisement, when the analysis indicates that the user of the user device is not the bot. Herein, any account-related data of the user may be maintained in the database. In an implementation, the user-interaction data received from the user device is stored at the database only upon confirmation that the user is human.

Moreover, the present description also relates to the method for detecting and preventing fraudulent activities in digital advertising as described above. The various embodiments and variants disclosed above apply mutatis mutandis to the aforementioned method.

Optionally, the at least one action comprises at least one of: notifying an advertising agency of the given digital advertisement, stopping to send any further data element to the user device, blacklisting a user account of the user, blacklisting the user device, recording a fraudulent activity conducted by the bot, recording information pertaining to the bot.

Optionally, the method further comprises:
receiving respective user-interaction data and respective sensor data at respective points of time from a plurality of user devices to which data elements of digital advertisements are sent;
analysing the respective user-interaction data and the respective sensor data received from the plurality of user devices, based on their time stamps, to determine a pattern of user interaction with the digital advertisements; and
training a machine learning model based on the determined pattern of user interaction with the digital advertisements, wherein the trained machine learning model is to be employed to analyse the at least one of: the number of taps, the touch pressures, the sizes of the touch areas, the locations of the touch areas, the time stamps of the taps to detect whether the user is a bot.

Optionally, the user-interaction data is further indicative of at least one of:
a time elapsed between a time instant at which the data element is rendered at the user device and a time instant at which the one or more taps are generated,
a total time duration in which the one or more taps are generated,
a time duration in which a given tap is generated,
a time elapsed between consecutive taps.

Optionally, the at least one sensor further comprises at least one of: an accelerometer, a gyroscope, and wherein the sensor data is further indicative of at least one of: a movement of the user device during the user interaction, an orientation of the user device during the user interaction.

Optionally, the at least one sensor further comprises at least one of: a location sensor, an imaging sensor, a temperature sensor, a proximity sensor, a fingerprint sensor, and wherein the sensor data is further indicative of at least one of: a location of the user device, an image of the user, an image of surroundings of the user device, an ambient temperature in surroundings of the user device, a proximity of the user to the user device, a fingerprint of the user.

Optionally, the step of analysing comprises:
calculating a reliability factor for the user based on said analysis; and
detecting whether or not the user is a bot, based on the calculated reliability factor.

Moreover, the present description also relates to the computer program product for detecting and preventing fraudulent activities in digital advertising as described above. The various embodiments and variants disclosed above apply mutatis mutandis to the aforesaid computer program product. The term "computer program product" refers to a software product comprising program instructions that are recorded on the non-transitory machine-readable data storage medium, wherein the software product is executable upon a computing hardware for implementing the aforementioned steps of the method detecting and preventing fraudulent activities in digital advertising.

In an embodiment, the non-transitory machine-readable date storage medium can direct a machine (such as computer, other programmable data processing apparatus, or other devices) to function in a particular manner, such that the program instructions stored in the non-transitory machine-readable data storage medium case a series of steps to implement the function specified in a flowchart corresponding to the instructions. Examples of the non-transitory machine-readable data storage medium includes, but is not limited to, an electronic storage device, a magnetic storage device, an optical storage device, an electromagnetic storage device, a semiconductor storage device, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, or any suitable combination thereof.

Optionally, the at least one action comprises at least one of: notifying an advertising agency of the given digital advertisement, stopping to send any further data element to the user device, blacklisting a user account of the user, blacklisting the user device, recording a fraudulent activity conducted by the bot, recording information pertaining to the bot.

Optionally, the program instructions, when executed by the processing device, cause the processing device to:
  receive respective user-interaction data and respective sensor data at respective points of time from a plurality of user devices to which data elements of digital advertisements are sent;
  analyse the respective user-interaction data and the respective sensor data received from the plurality of user devices, based on their time stamps, to determine a pattern of user interaction with the digital advertisements; and
  train a machine learning model based on the determined pattern of user interaction with the digital advertisements, wherein the trained machine learning model is to be employed to analyse the at least one of: the number of taps, the touch pressures, the sizes of the touch areas, the locations of the touch areas, the time stamps of the taps to detect whether the user is a bot.

Optionally, the user-interaction data is further indicative of at least one of:
  a time elapsed between a time instant at which the data element is rendered at the user device and a time instant at which the one or more taps are generated,
  a total time duration in which the one or more taps are generated,
  a time duration in which a given tap is generated,
  a time elapsed between consecutive taps.

Optionally, the at least one sensor further comprises at least one of: an accelerometer, a gyroscope, and wherein the sensor data is further indicative of at least one of: a movement of the user device during the user interaction, an orientation of the user device during the user interaction.

Optionally, the at least one sensor further comprises at least one of: a location sensor, an imaging sensor, a temperature sensor, a proximity sensor, a fingerprint sensor, and wherein the sensor data is further indicative of at least one of: a location of the user device, an image of the user, an image of surroundings of the user device, an ambient temperature in surroundings of the user device, a proximity of the user to the user device, a fingerprint of the user.

Optionally, when analysing the at least one of: the number of taps, the touch pressures, the sizes of the touch areas, the locations of the touch areas, the time stamps of the taps to detect whether the user is a bot, the program instructions, when executed by the processing device, cause the processing device to:
  calculate a reliability factor for the user based on said analysis; and
  detect whether or not the user is a bot, based on the calculated reliability factor.

DETAILED DESCRIPTION OF THE DRAWINGS

Figure 1:
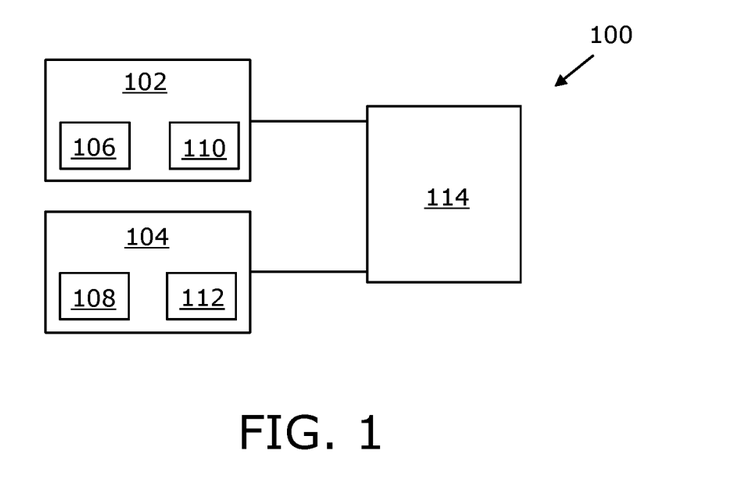
FIG. 1 illustrates a network environment in which a system for detecting and preventing fraudulent activities in digital advertising can be implemented, pursuant to embodiments of the present disclosure.

Referring to FIG. 1, there is shown a network environment in which a system 100 for detecting and preventing fraudulent activities in digital advertising can be implemented, pursuant to embodiments of the present disclosure. As shown, the network environment comprises a plurality of user devices, shown as user devices 102 and 104. The user devices 102 and 104 have sensors 106 and 108, and touchscreens 110 and 112, respectively. The system 100 comprises a server arrangement 114 that is communicably coupled with the user devices 102 and 104.

Figure 2:
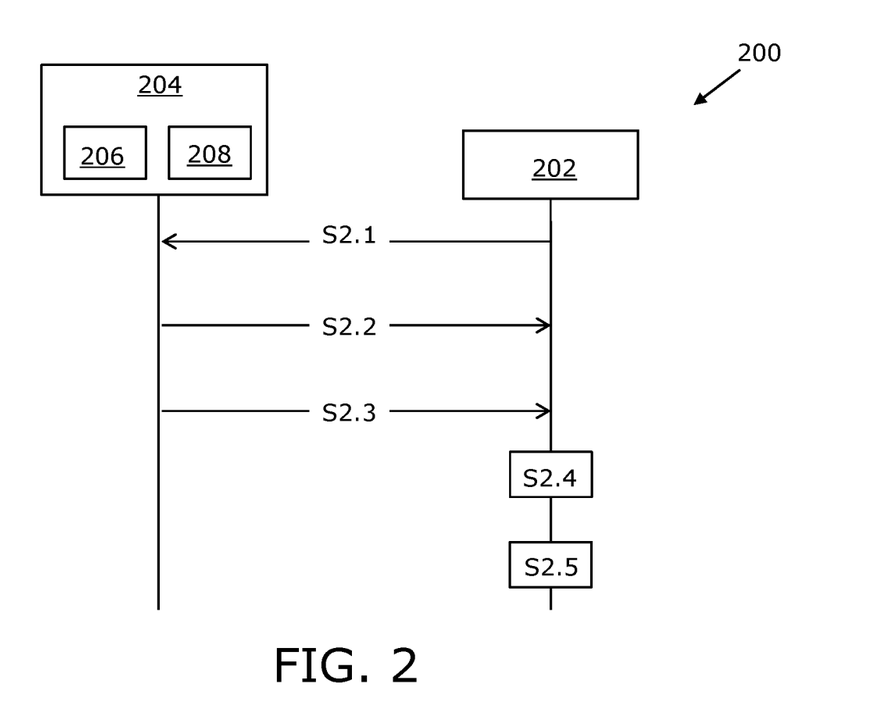
FIG. 2 is an exemplary sequence diagram of implementation of the aforesaid system, in accordance with an embodiment of the present disclosure.

Referring to FIG. 2, illustrated is an exemplary sequence diagram of implementation of a system 200 for detecting and preventing fraudulent activities in digital advertising, in accordance with an embodiment of the present disclosure. At a step S2.1, a server arrangement 202 transmits a data element of a given digital advertisement to a user device 204. At a step S2.2, the server arrangement 202 receives user-interaction data from the user device 204 responsive to a rendering of the data element at the user device 204, wherein the user-interaction data is indicative of one or more taps being generated in response to the data element being rendered at the user device 204, wherein the user-interaction data is time stamped. At a step S2.3, the server arrangement 202 receives sensor data from the user device 204, the sensor data being collected by at least one sensor (implemented herein as a sensor 206) of the user device 204 during generation of the user-interaction data, wherein the sensor 206 comprises a touch-pressure sensor, and the sensor data is indicative of at least one of: a touch pressure applied by the user on a touchscreen 208 of the user device 204 during each tap, a size of a touch area on the touchscreen 208 during each tap, a location of the touch area on the touchscreen 208 during each tap, wherein the sensor data is time stamped. At step S2.4, the server arrangement 202 analyses at least one of: a number of taps indicated in the user-interaction data, touch pressures during the taps, sizes of touch areas on the touchscreen during the taps, locations of the touch areas on the touchscreen during the taps, time stamps of the taps, to detect whether a user of the user device 204 is a bot. At a step S2.5, the server arrangement 202 performs at least one action when the analysis indicates that the user of the user device 204 is a bot.

Figure 3:
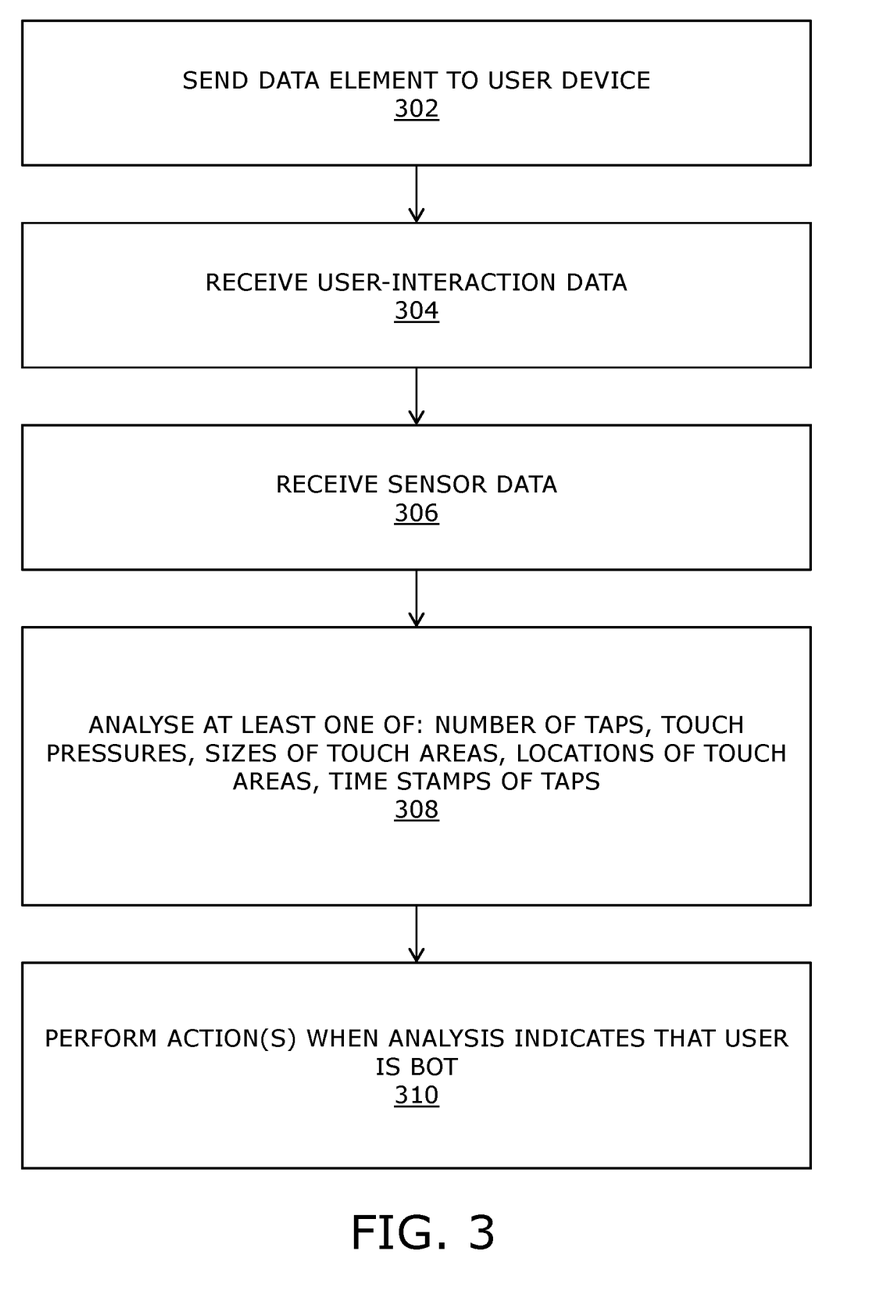
FIG. 3 is an illustration of a flowchart listing steps of a method for detecting and preventing fraudulent activities in digital advertising, in accordance with an embodiment of the present disclosure.

Referring to FIG. 3, illustrated are steps of a method for detecting and preventing fraudulent activities in digital advertising, in accordance with an embodiment of the present disclosure. At a step 302, a data element of a given digital advertisement is sent to a user device. At a step 304, user-interaction data is received from the user device responsive to a rendering of the data element at the user device, wherein the user-interaction data is indicative of one or more taps being generated in response to the data element being rendered at the user device, wherein the user-interaction data is time stamped. At a step 306, sensor data is received from the user device, the sensor data being collected by at least one sensor of the user device during generation of the user-interaction data, wherein the at least one sensor comprises a touch-pressure sensor, and the sensor data is indicative of at least one of: a touch pressure applied by the user on a touchscreen of the user device during each tap, and a size of a touch area on the touchscreen during each tap, a location of the touch area on the touchscreen during each tap, wherein the sensor data is time stamped.

At a step 308, at least one of: a number of taps indicated in the user-interaction data, touch pressures during the taps, sizes of touch areas on the touchscreen during the taps, locations of the touch areas on the touchscreen during the taps, time stamps of the taps, is analysed to detect whether a user of the user device is a bot. At a step 310, at least one action is performed when the analysis indicates that the user of the user device is a bot.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for detecting and preventing fraudulent activities in digital advertising, the system comprising a server arrangement that is communicably coupled with a user device, wherein the server arrangement is configured to:
send a data element of a given digital advertisement to the user device;
receive user-interaction data from the user device responsive to a rendering of the data element at the user device, wherein the user-interaction data is indicative of one or more taps being generated in response to the data element being rendered at the user device, wherein the user-interaction data is time stamped;
receive sensor data from the user device, the sensor data being collected by at least one sensor of the user device during generation of the user-interaction data, wherein the at least one sensor comprises a touch-pressure sensor, and the sensor data is indicative of at least one of: a touch pressure applied by the user on a touchscreen of the user device during each tap, a size of a touch area on the touchscreen during each tap, a location of the touch area on the touchscreen during each tap, wherein the sensor data is time stamped;
analyse at least one of: a number of taps indicated in the user-interaction data, touch pressures during the taps, sizes of touch areas on the touchscreen during the taps, locations of the touch areas on the touchscreen during the taps, time stamps of the taps, to detect whether a user of the user device is a bot; and
perform at least one action when the analysis indicates that the user of the user device is a bot.

2. The system of claim 1, wherein the at least one action comprises at least one of: notifying an advertising agency of the given digital advertisement, stopping to send any further data element to the user device, blacklisting a user account of the user, blacklisting the user device, recording a fraudulent activity conducted by the bot, recording information pertaining to the bot.

3. The system of claim 1, wherein the server arrangement is configured to:
receive respective user-interaction data and respective sensor data at respective points of time from a plurality of user devices to which data elements of digital advertisements are sent;
analyse the respective user-interaction data and the respective sensor data received from the plurality of user devices, based on their time stamps, to determine a pattern of user interaction with the digital advertisements; and
train a machine learning model based on the determined pattern of user interaction with the digital advertisements, wherein the trained machine learning model is to be employed to analyse the at least one of: the number of taps, the touch pressures, the sizes of the touch areas, the locations of the touch areas, the time stamps of the taps to detect whether the user is a bot.

4. The system of claim 1, wherein the user-interaction data is further indicative of at least one of:
a time elapsed between a time instant at which the data element is rendered at the user device and a time instant at which the one or more taps are generated,
a total time duration in which the one or more taps are generated,
a time duration in which a given tap is generated,
a time elapsed between consecutive taps.

5. The system of claim 1, wherein the at least one sensor further comprises at least one of: an accelerometer, a gyroscope, and wherein the sensor data is further indicative of at least one of: a movement of the user device during the user interaction, an orientation of the user device during the user interaction.

6. The system of claim 1, wherein the at least one sensor further comprises at least one of: a location sensor, an imaging sensor, a temperature sensor, a proximity sensor, a fingerprint sensor, and wherein the sensor data is further indicative of at least one of: a location of the user device, an image of the user, an image of surroundings of the user device, an ambient temperature in surroundings of the user device, a proximity of the user to the user device, a fingerprint of the user.

7. The system of claim 1, wherein, when analysing the at least one of: the number of taps, the touch pressures, the sizes of the touch areas, the locations of the touch areas, the time stamps of the taps to detect whether the user is the bot, the server arrangement is configured to:
calculate a reliability factor for the user based on said analysis; and
detect whether or not the user is the bot, based on the calculated reliability factor.

8. A method for detecting and preventing fraudulent activities in digital advertising, the method comprising:
sending a data element of a given digital advertisement to a user device;
receiving user-interaction data from the user device responsive to a rendering of the data element at the user device, wherein the user-interaction data is indicative of one or more taps being generated in response to the data element being rendered at the user device, wherein the user-interaction data is time stamped;
receiving sensor data from the user device, the sensor data being collected by at least one sensor of the user device during generation of the user-interaction data, wherein the at least one sensor comprises a touch-pressure sensor, and the sensor data is indicative of at least one of: a touch pressure applied by the user on a touchscreen of the user device during each tap, a size of a touch area on the touchscreen during each tap, a location of the touch area on the touchscreen during each tap, wherein the sensor data is time stamped;
analysing at least one of: a number of taps indicated in the user-interaction data, touch pressures during the taps, sizes of touch areas on the touchscreen during the taps, locations of the touch areas on the touchscreen during the taps, time stamps of the taps, to detect whether a user of the user device is a bot; and
performing at least one action when the analysis indicates that the user of the user device is a bot.

9. The method of claim 8, wherein the at least one action comprises at least one of: notifying an advertising agency of the given digital advertisement, stopping to send any further data element to the user device, blacklisting a user account of the user, blacklisting the user device, recording a fraudulent activity conducted by the bot, recording information pertaining to the bot.

10. The method of claim 8, further comprising:
receiving respective user-interaction data and respective sensor data at respective points of time from a plurality of user devices to which data elements of digital advertisements are sent;
analysing the respective user-interaction data and the respective sensor data received from the plurality of user devices, based on their time stamps, to determine a pattern of user interaction with the digital advertisements; and
training a machine learning model based on the determined pattern of user interaction with the digital advertisements, wherein the trained machine learning model is to be employed to analyse the at least one of: the number of taps, the touch pressures, the sizes of the touch areas, the locations of the touch areas, the time stamps of the taps to detect whether the user is a bot.

11. The method of claim 8, wherein the user-interaction data is further indicative of at least one of:
a time elapsed between a time instant at which the data element is rendered at the user device and a time instant at which the one or more taps are generated,
a total time duration in which the one or more taps are generated,
a time duration in which a given tap is generated,
a time elapsed between consecutive taps.

12. The method of claim 8, wherein the at least one sensor further comprises at least one of: an accelerometer, a gyroscope, and wherein the sensor data is further indicative of at least one of: a movement of the user device during the user interaction, an orientation of the user device during the user interaction.

13. The method of claim 8, wherein the at least one sensor further comprises at least one of: a location sensor, an imaging sensor, a temperature sensor, a proximity sensor, a fingerprint sensor, and wherein the sensor data is further indicative of at least one of: a location of the user device, an image of the user, an image of surroundings of the user device, an ambient temperature in surroundings of the user device, a proximity of the user to the user device, a fingerprint of the user.

14. The method of claim 8, wherein the step of analysing comprises:
calculating a reliability factor for the user based on said analysis; and
detecting whether or not the user is the bot, based on the calculated reliability factor.

15. A computer program product for detecting and preventing fraudulent activities in digital advertising, the computer program product comprising a non-transitory machine-readable data storage medium having stored thereon program instructions that, when executed by a processing device, cause the processing device to:
send a data element of a given digital advertisement to a user device;
receive user-interaction data from the user device responsive to a rendering of the data element at the user device, wherein the user-interaction data is indicative of one or more taps being generated in response to the data element being rendered at the user device, wherein the user-interaction data is time stamped;
receive sensor data from the user device, the sensor data being collected by at least one sensor of the user device during generation of the user-interaction data, wherein the at least one sensor comprises a touch-pressure sensor, and the sensor data is indicative of at least one of: a touch pressure applied by the user on a touchscreen of the user device during each tap, a size of a touch area on the touchscreen during each tap, a location of a touch area on the touchscreen during each tap, wherein the sensor data is time stamped;
analyse at least one of: a number of taps indicated in the user-interaction data, touch pressures during the taps, sizes of touch areas on the touchscreen during the taps, locations of the touch areas on the touchscreen during the taps, time stamps of the taps, to detect whether a user of the user device is a bot; and
perform at least one action when the analysis indicates that the user of the user device is a bot.

16. The computer program product of claim 15, wherein the at least one action comprises at least one of: notifying an advertising agency of the given digital advertisement, stopping to send any further data element to the user device, blacklisting a user account of the user, blacklisting the user device, recording a fraudulent activity conducted by the bot, recording information pertaining to the bot.

17. The computer program product of claim 15, wherein the program instructions, when executed by the processing device, cause the processing device to:
receive respective user-interaction data and respective sensor data at respective points of time from a plurality of user devices to which data elements of digital advertisements are sent;
analyse the respective user-interaction data and the respective sensor data received from the plurality of user devices, based on their time stamps, to determine a pattern of user interaction with the digital advertisements; and
train a machine learning model based on the determined pattern of user interaction with the digital advertisements, wherein the trained machine learning model is to be employed to analyse the at least one of: the number of taps, the touch pressures, the sizes of the touch areas, the locations of the touch areas, the time stamps of the taps to detect whether the user is a bot.

18. The computer program product of claim 15, wherein the user-interaction data is further indicative of at least one of:
a time elapsed between a time instant at which the data element is rendered at the user device and a time instant at which the one or more taps are generated,
a total time duration in which the one or more taps are generated,
a time duration in which a given tap is generated,
a time elapsed between consecutive taps.

19. The computer program product of claim 15, wherein the at least one sensor further comprises at least one of: an accelerometer, a gyroscope, and wherein the sensor data is further indicative of at least one of: a movement of the user device during the user interaction, an orientation of the user device during the user interaction.

20. The computer program product of claim 15, wherein the at least one sensor further comprises at least one of: a location sensor, an imaging sensor, a temperature sensor, a proximity sensor, a fingerprint sensor, and wherein the sensor data is further indicative of at least one of: a location of the user device, an image of the user, an image of surroundings of the user device, an ambient temperature in surroundings of the user device, a proximity of the user to the user device, a fingerprint of the user.

21. The computer program product of claim 15, wherein when analysing the at least one of: the number of taps, the touch pressures, the sizes of the touch areas, the locations of the touch areas, the time stamps of the taps to detect whether the user is the bot, the program instructions, when executed by the processing device, cause the processing device to:
   calculate a reliability factor for the user based on said analysis; and
   detect whether or not the user is the bot, based on the calculated reliability factor.

\* \* \* \* \*